United States Patent
Li et al.

(10) Patent No.: US 9,178,298 B2
(45) Date of Patent: Nov. 3, 2015

(54) SUBSCRIBER IDENTITY MODULE CONNECTOR

(71) Applicant: ADVANCED-CONNETEK INC., New Taipei (TW)

(72) Inventors: Jin-Fei Li, Guangdong (CN); Pin-Yuan Hou, New Taipei (TW)

(73) Assignee: ADVANCED-CONNETEK INC., New Taipei (TW)

( * ) Notice: Subject to any disclaimer, the term of this patent is extended or adjusted under 35 U.S.C. 154(b) by 0 days.

(21) Appl. No.: 14/218,360

(22) Filed: Mar. 18, 2014

(65) Prior Publication Data

US 2015/0104979 A1    Apr. 16, 2015

(30) Foreign Application Priority Data

Oct. 16, 2013   (CN) .......................... 2013 1 0483870

(51) Int. Cl.
*H01R 13/00* (2006.01)
*H01R 13/24* (2006.01)
*G06K 7/00* (2006.01)
*H01R 12/71* (2011.01)

(52) U.S. Cl.
CPC .......... *H01R 13/2442* (2013.01); *G06K 7/0021* (2013.01); *H01R 12/714* (2013.01)

(58) Field of Classification Search
CPC ............. H01R 13/2442; H01R 13/641; H01R 2103/00; G06K 7/0021
USPC ................................... 439/626, 630, 489, 188
See application file for complete search history.

(56) References Cited

U.S. PATENT DOCUMENTS

2006/0063422 A1* 3/2006 Lu et al. .......................... 439/489
2012/0129370 A1* 5/2012 Zhou et al. ..................... 439/188

\* cited by examiner

*Primary Examiner* — Abdullah Riyami
*Assistant Examiner* — Nelson R Burgos-Guntin
(74) *Attorney, Agent, or Firm* — Muncy, Geissler, Olds & Lowe, P.C.

(57) ABSTRACT

The present invention discloses a subscriber identity module connector which places a detecting terminal and a grounding terminal into a same contact area. The above placement of the detecting terminal and the grounding terminal form a circuit to determine if a SIM card is inserted appropriately. As a result, there is no need to set conventional detecting unit, and the space of the subscriber identity module connector are advantageously saved. It not only simplifies the placement of circuit board (PCB) and but also reduces the manufacturing cost.

20 Claims, 7 Drawing Sheets

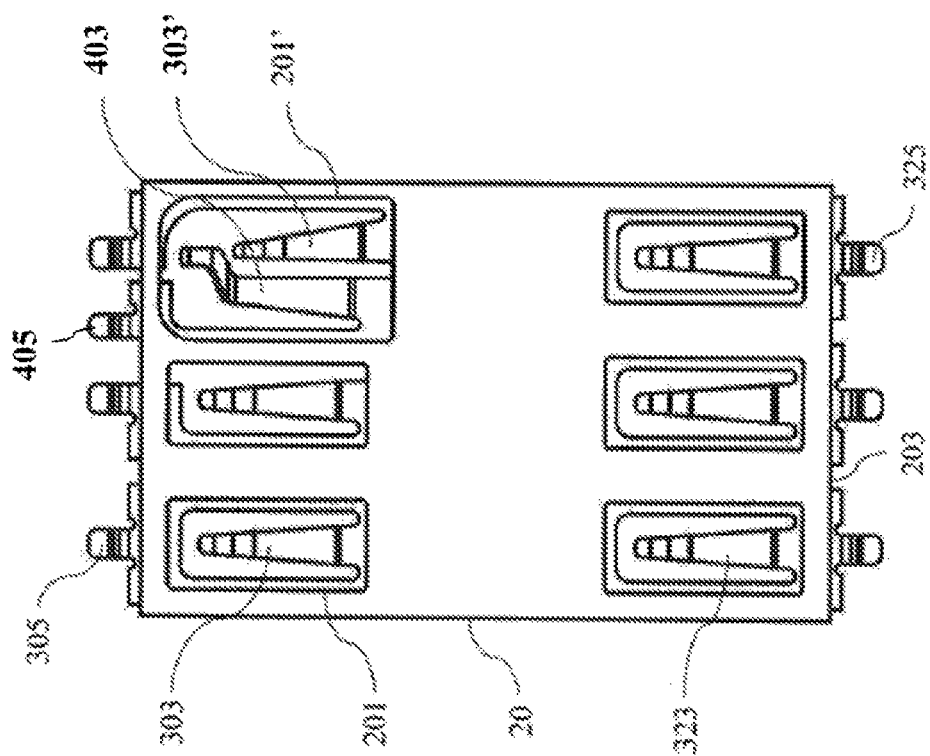

SUBSCRIBER IDENTITY MODULE CONNECTOR

FIELD OF THE INVENTION

The present invention relates to a subscriber identity module connector, and more particularly to an identity module connector that optimizes the placement of a detecting terminal and a grounding terminal.

BACKGROUND OF THE INVENTION

In the modem life, consumer electronics, such as digital camera, PDA, cellular phone, and electronic components thereof have the characteristics of small size, thin thickness and light weight. With the development of communication industry, the popularity of cellular phone is also increasing. Not only the office workers, the undergraduate students, high school students, but also the teenagers, the elders, and even the kids use cellular phones these days. Cellular phones provide convenient and prompt communications at work and in daily life. Several years ago, the cellular phone is only the tool for voice communication, and short message service; today, we can surf the internet, deliver e-mal, watch TV, and photograph by cellular phone. Cellular phones further satisfy people's needs at work and in daily life.

To identify the users' identity or personal information, subscriber identity module cards (SIM cards) with conductive surfaces are installed in the cellular phones. SIM card connector is installed to provide a quick connection between the SIM card and the cellular phone. The SIM card connector helps to complete checking process and provide wireless communication service by electrical contacting to the conductive surfaces of the SIM cards.

There can be a problem of determining if the SIM card is inserted in the SIM card connector appropriately because the SIM card and SIM card connector are tiny units. Please refer to FIG. 1. FIG. 1 is the diagram of SIM card connector according to the prior art. As shown in FIG. 1, a detecting terminal 901 is particularly placed on one side of a SIM card connector 90. While the SIM card is inserted into the SIM card connector 90, the detecting terminal 901 determines whether the SIM card is inserted into the SIM card connector 90 appropriately by contacting the SIM card. Hence, the detecting terminal 901 enlarges the size of the SIM card connector 90. Moreover, the manufacturing cost of the SIM card connector 90 increases.

SUMMARY OF THE INVENTION

In order to solve the aforementioned drawbacks, the present invention provides a subscriber identity module connector and more particularly to a subscriber identity module connector that integrates a detecting terminal and a grounding terminal.

According to the above objectives, the present invention provides a subscriber identity module connector which has a plurality of first terminals, a plurality of second terminal and a insulation shell. Each of the second terminals is placed correspondingly to each of the first terminals. The first terminals and the second terminals are accommodated in the insulation shell. Each of the first terminals and each of the second terminals arc respectively formed with a regular part forming a space and a contact part extending from the regular part into the space. There is an interval provided between each of the regular parts and each of the contact parts. A plurality of hollow areas are formed on the insulation shell to allow each of the contact parts to expose outward. The subscriber identity module is characterized in that: a detecting terminal is placed in any one of the hollow areas of the insulation shell, the detecting terminal is formed with a detecting-regular part forming an activity space and a detecting-contact part extending from the detecting-regular part to the activity space. The detecting-regular part is accommodated in the insulation shell. The detecting-contact part extends from the detecting-regular part and one of the contact parts are placed in the same hollow area and exposed outward from the same hollow area of the insulation shell.

The present invention provides a subscriber identity module connector placing a detecting terminal and a grounding terminal in the same hollow area, which simplifies the conventional design of a subscriber module connector without setting a detecting element. As a result, the subscriber identity module connector of the present invention reduces the size of circuit board (PCB) and the manufacturing cost of the subscriber identity module connector.

BRIEF DESCRIPTION OF THE DRAWINGS

The present invention will be apparent to those skilled in the art by reading the following description of a preferred embodiment thereof with reference to the drawings, in which:

FIG. 3A is a top view of the terminals connected with the insulation shell of the subscriber identity module connector in accordance with the present invention;

DETAILED DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
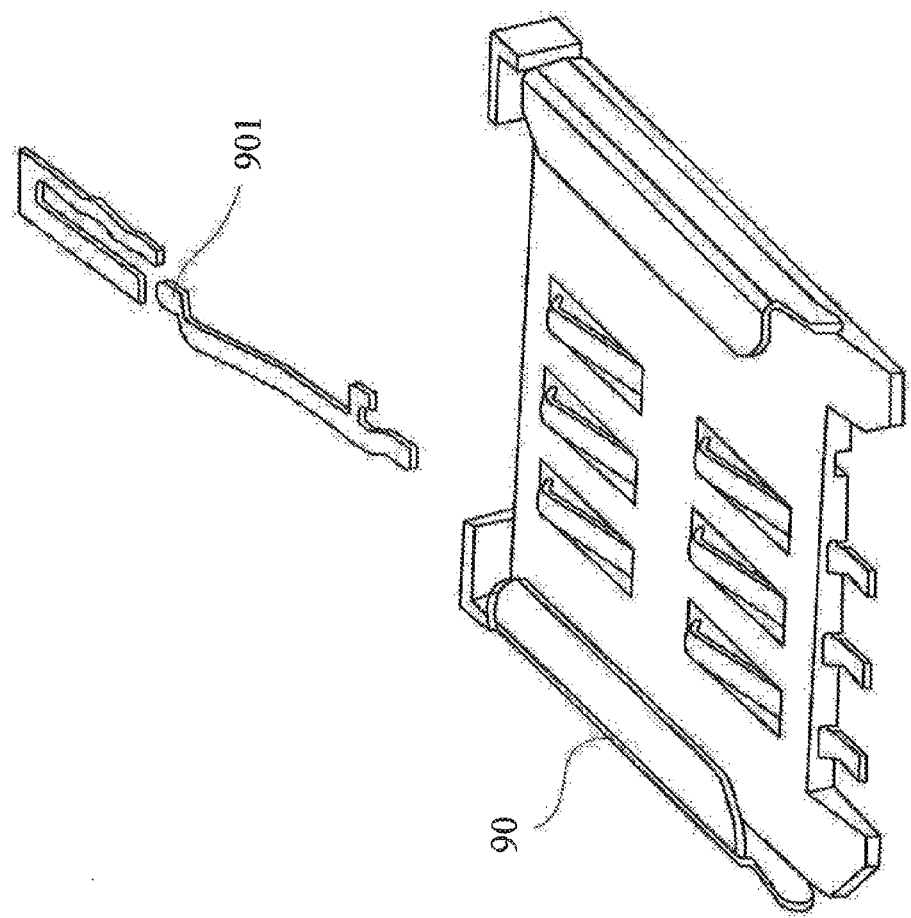
FIG. 1 is a diagram of prior art SIM card connector.
Figure 2:
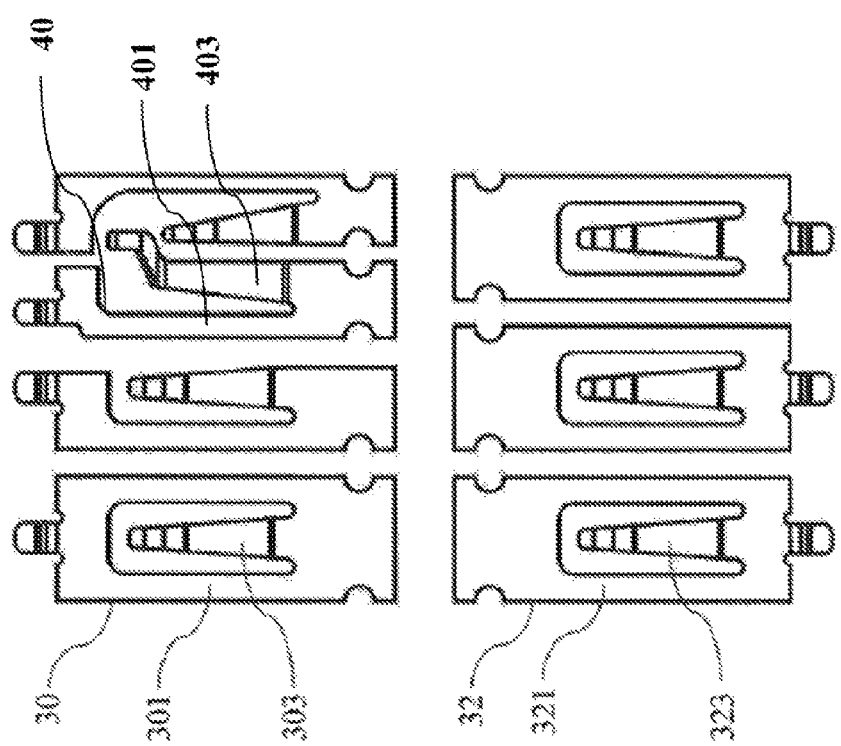
FIG. 2 is a diagram of the terminals of the subscriber identity module connector in accordance with the present invention.

Please refer to FIG. 2. FIG. 2 is a diagram of the terminals of the subscriber identity module connector in accordance with the present invention. As shown in FIG. 2, a plurality of first terminals 30 and a plurality of second terminals 32 are provided on a subscriber identity module connector. Each of the second terminals 32 is positioned correspondingly to one of the first terminals 30. Each of the first terminals 30 is formed by a regular part 301 forming a space and a contact part 303 extending from the regular part 301 into the space. Each of the second terminals 32 is formed by a regular part 321 forming a space and a contact part 323 extending from the regular part 321 into the space. The contact part 303 of each of the first terminals 30 is connected with the regular part 301. There is an interval between each of the contact part 303 and regular part 301. Similarly, the contact part 323 of each of the second terminals 32 is connected with the regular part 321. There is an interval between each of the contact part 323 and regular part 321.

Moreover, a detecting terminal 40 is formed near one of the first terminal 30. The detecting terminal 40 is formed with a detecting-regular part 401 forming a space (activity space) and a detecting-contact part 403 (i.e. the detecting-contact part of the switch terminal C) extending from the detecting-regular part 401 to the space. The detecting-contact part 403 (i.e. the detecting-contact part of the switch terminal C) is connected with the detecting-regular part 401 and there is an interval between the detecting-contact part 403 (i.e. the detecting-contact part of the switch terminal C) and the detecting-regular part 401. The subscriber identity module connector according to the present invention includes, but not limited, three first terminals 30 and three second terminals 30 (total six terminals) Moreover, it should be recognized that the first terminals 30, the second terminals 32, the regular parts 301, 302, the and contact parts 303, 323 are formed integrally. Similarly, the detecting terminal 40, the detecting-regular part 401 and the detecting-contact part 403 (i.e. the detecting-contact part of the switch terminal C) are formed integrally. The regular parts 301, 321, the contact parts 303, 323, the detecting part 401 and the detecting-contact part 403 (i.e. the detecting-contact part of the switch terminal C) is formed in a geometrical shape.

Figure 3B:
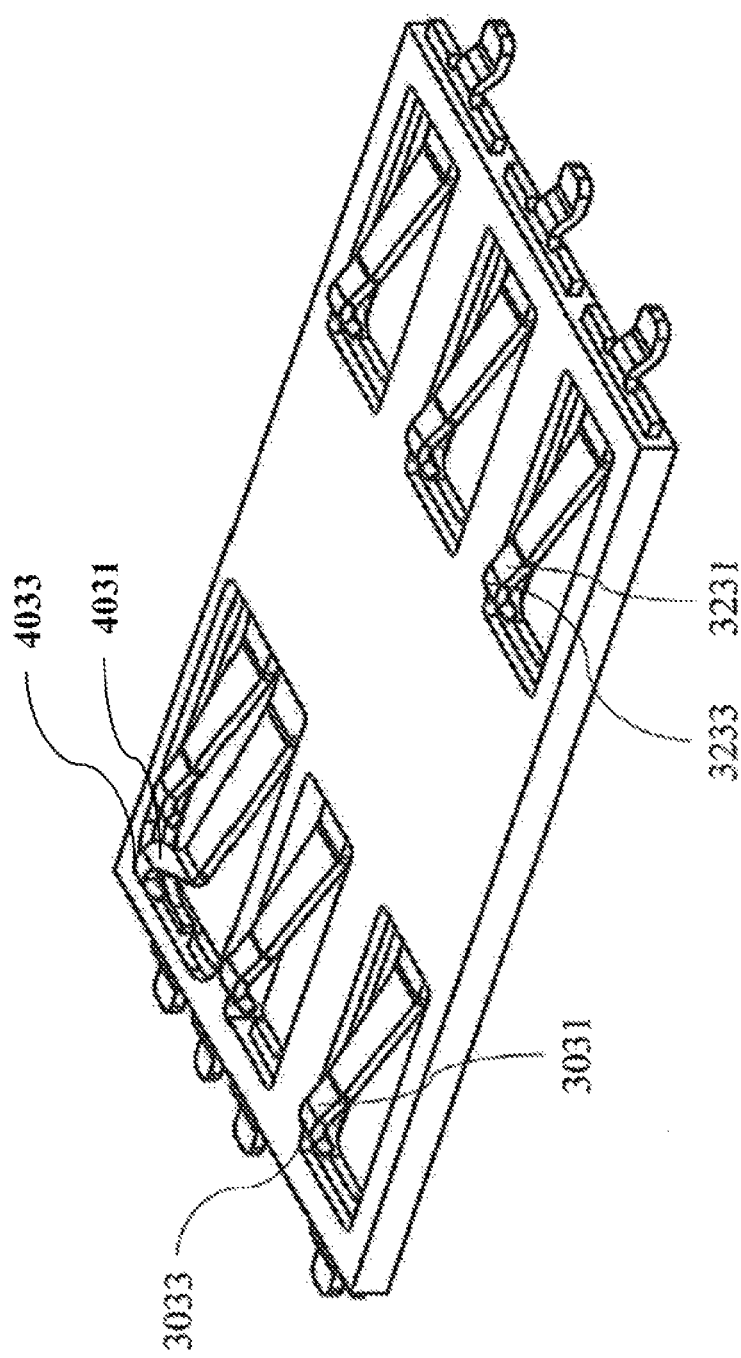
FIG. 3B is a diagram of the terminals connected with the insulation shell of the subscriber identity module connector in accordance with the present invention.

Next, please refer to FIG. 3A and FIG. 3B. FIG. 3A and FIG. 3B are respectively the top view and the diagram of the terminals connected with the insulation shell of the subscriber identity module connector of the present invention. As shown in FIG. 3A, an insulation shell 20 includes a plurality of hollow areas 201. The first terminals 30, the second terminals 32 and the detecting terminal 40 are accommodated in the insulation shell 20. The regular parts 301, 321 and the detecting-regular part 401 are covered by the insulation shell 20; and the contact parts 303, 323 and the detecting-contact part 403 (i.e. the detecting-contact part of the switch terminal C)are exposed from the hollow areas 201. Additionally, the detecting-contact part 403 (i.e. the detecting-contact part of the switch terminal C) and one of the contact part 303' (i.e. the contact part of the ground terminal D) are placed and exposed in a same hollow area 201'. Furthermore, each of the first terminals 30, each of the second terminals 32 and the detecting terminals 40 further extends respectively to form a soldering parts 305, 325, 405, and the soldering parts 305, 325, 405 are used to be soldered with a printed circuit board. Each of the soldering parts 305, 325, 405 is exposed on the outer part 203 outside the insulation shell 20.

Next please refer to FIG. 3B. As shown in FIG. 3B, each of the contact parts 303, 323 and the detecting-contact parts 403 (i.e. the detecting-contact part of the switch terminal C) respectively extends to form a curving part 3031, 3231, 4031, which makes the contact parts 303, 323 and the detecting-contact part 403 (i.e. the detecting-contact part of the switch terminal C0 exposing outward from the hollow areas 201 of the insulation shell 20 to protrude out of the insulation shell 20 surface. Moreover, the free end of the curving part 3031, 3231, 4031 respectively forms reaching parts 3033, 3233, 4033, which are used to contact with SIM cards or IC cards. The first terminals 30, second terminals 32 and detecting terminal 40 are preferably but not limited covered by the insulation shell 20 by an insert injection molding process. However, the way of covering the those terminals are not limited according to the present invention. The insulation shell 20 is made of macromolecular material and the terminals (modules) 30 are made of metal in this embodiment. Moreover, the shapes of the hollow areas 201 can be modified to match the first terminals 30, the second terminals 32 and the detecting terminals 40. In addition, to accommodate the contact part 323 and the detecting-contact part 403 (i.e. the detecting-contact part of the switch terminal C), the size of the hollow area 201' is larger than that of other hollow areas 201. However, the size of the hollow areas 201, 201' are not limited in the present invention.

Figure 4:
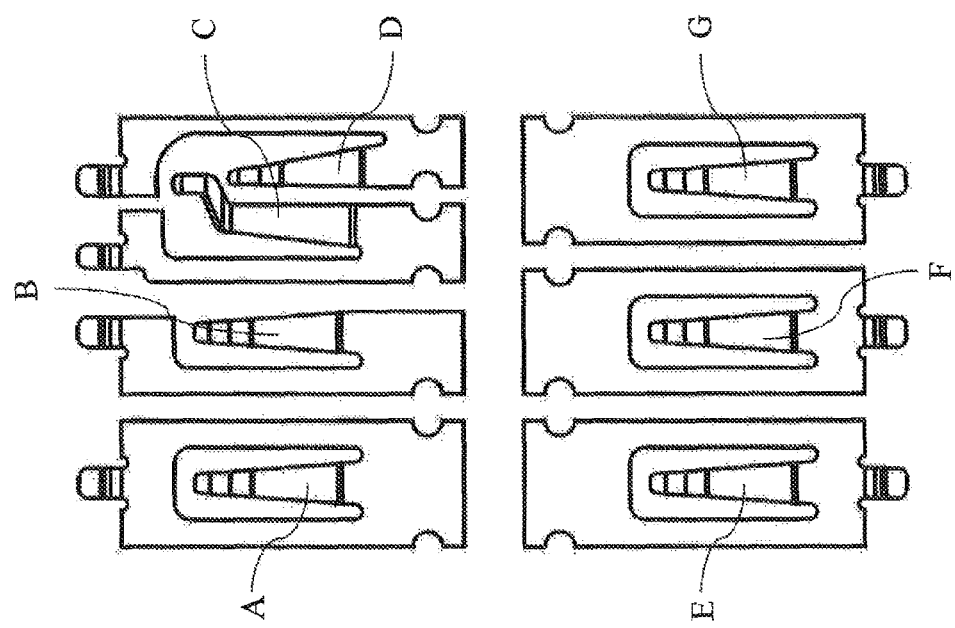
FIG. 4 is a diagram of the terminals of subscriber identity module connector in accordance with the present invention.

Please refer to FIG. 4. FIG. 4 is the diagram of the subscriber identity module connector in accordance with the present invention. As shown in FIG. 4, there are seven terminals provide on the subscriber identity module connector in accordance with the present invention, including: serial data input/output terminal A, programming voltage terminal B, switch terminal C(i.e. detecting terminal 40), ground terminal D, clocking signal terminal E, reset signal terminal F, and power supply terminal G. The switch terminal C (i.e. detecting terminal 40) and the ground terminal D are both placed in the same hollow area 201'.

Figure 5A:
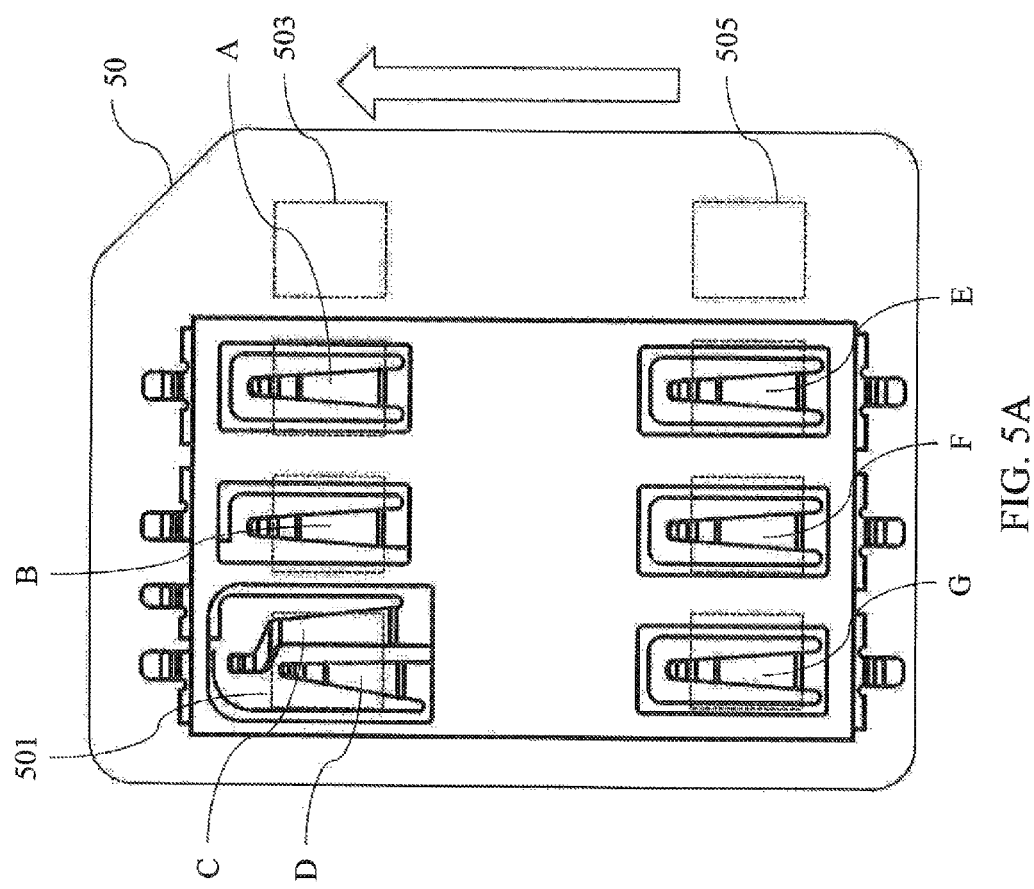
FIGS. 5A and 5B are the diagrams of a SIM card inserted into the subscriber identity module connector in accordance with the present invention.
Figure 5B:
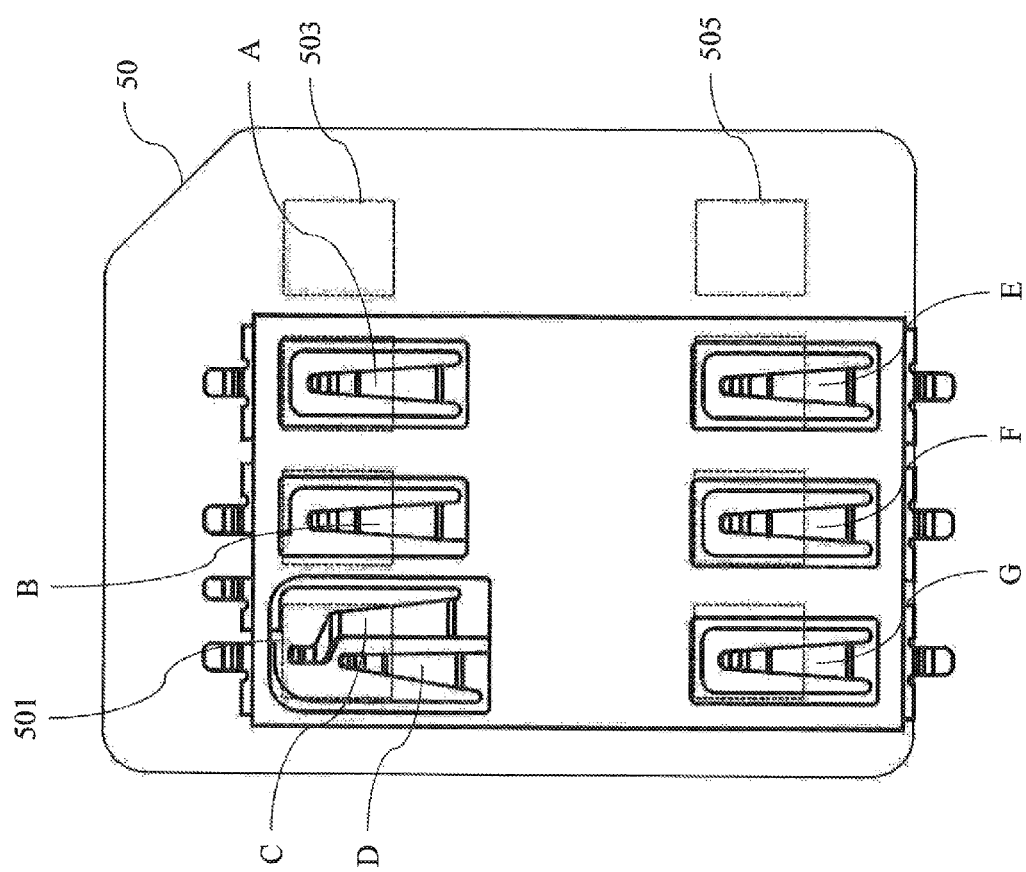

Please refer to FIG. 5A and FIG. 5B. FIG. 5A and FIG. 5B are the diagrams of a SIM card inserted into the subscriber identity module connector in accordance with the present invention. As shown in FIG. 5A, there are eight contact areas 501, 503, 505 on a SIM card (or a IC card) 50. Generally, the SIM card for mobile communication merely use six of the aforesaid eight contact areas 501, and other two spare contact areas 503, 505 are not used. Hence, the six functional contact areas 501 are used for describing the embodiment of the present invention in the following description. The six functional contact areas 501 correspond respectively to each of the terminals used (contact parts 303, 323 and detecting-contact part 403)(i.e. the detecting-part of the switch terminal C). When the SIM card 50 is inserted into the subscriber identity module connector of a device such as the SIM card holder of a cellular phone or a tablet PC, the six functional contact areas 501 firstly contacts serial data input/output terminal A, programming voltage terminal B, ground terminal D, clocking signal terminal E, reset signal terminal F, and power supply terminal G. And then, please refer to FIG. 5B, when the SIM card 50 is fully inserted, the contact area 501 simultaneously contacts with the ground terminal D and the switch terminal C (detecting terminal 40) such that an electrical connection is formed between the switch terminal C (i.e. detecting terminal 40) and the ground terminal D. In other words, when the SIM card 50 is fully inserted, the contact area 501 simultaneously contacts with the contact part 303' of the ground terminal D and the detecting-part 403 of the detecting terminal 40 such that an electrical connection is established between the detecting terminal 40 and the ground terminal D so as to activate a circuit on the printed circuit board.

The electrical connection established between the aforesaid two terminals enable the electrical devices such as cellular phone and tablet PC to determine if the SIM card 50 is inserted in the SIM card holder appropriately; meanwhile, the switch terminal C (i.e. detecting terminal 40) and the ground terminal D are both placed in the same hollow area 201' to simplify the assembly of the detecting unit of the subscriber identity module connector. It not only reduces the volume of the circuit board (PCB) but also decreases the manufacturing cost. In addition, placing the switch terminal C (i.e. detecting terminal 40) and the ground terminal D in the same hollow area 201' advantageously reduces the interference of noise. However, the placement of the switch terminal C (i.e. detecting terminal 40) and other terminals in a same hollow area 201' is not limited in the present invention, Furthermore, once the arrangement of the contact areas 501 of the SIM card 50 changes, or the once the more contact areas such as spared contact areas 503, 505 are used for IC cards or credit cards, the number of the hollow areas 201, the first terminals 30 and the second terminals 32 can be modified accordingly. Therefore, the number of the hollow areas 201, the first terminals 30 and the second terminals 32 are not limited in the present invention.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A subscriber identity module connector comprises a plurality of first terminals, a plurality of second terminals placed correspondingly to each of the first terminals, and an insulation shell accommodating the first terminals and the second terminals, wherein each of the first terminals and each of the second terminals is respectively formed with a regular part to form a space and a contact part extending from the regular part into the space, an interval is provided between each of the contact parts and each of the regular parts, and a plurality of hollow areas are formed on the insulation shell to allow each of the contact parts to expose outward, and the subscriber identity module connector is characterized in that:
a detecting terminal is placed in one of the hollow areas of the insulation shell, the detecting terminal is formed with a detecting-regular part forming an activity space, a detecting-contact part extending from the detecting-regular part to the activity space, and the detecting-regular part is accommodated in the insulation shell, wherein the detecting-contact part extending from the detecting-regular part and one of the contact parts that plays a role as a ground terminal are placed in the same hollow area and are exposed outward from the same hollow area of the insulation shell,
wherein when the subscriber identity module card is fully inserted, one contact area of the subscriber identity module card simultaneously contacts with detecting-contact part of the detecting terminal and the ground terminal such that an electrical connection is established between the detecting terminal and the ground terminal.

2. The subscriber identity module connector according to claim 1, wherein each of the contact parts and the detecting-contact part respectively extends to form a curving part to allow each of the contact parts exposing outward from the hollow areas of the insulation shell and the detecting-contact part to protrude out of the insulation shell surface.

3. The subscriber identity module connector according to claim 2, wherein the free end of each of the curving parts is a reaching part.

4. The subscriber identity module connector according to claim 1, wherein each of the first terminals, each of the second terminals and the detecting terminal are covered by the insulation shell by an insert injection molding process, and each of the contact parts of the first terminals, each of the contact parts of the second terminals and the detecting-contact part of the detecting terminal are exposed from the hollow area.

5. The subscriber identity module connector according to claim 1, wherein each of the first terminals, each of the second terminals and the detecting terminal respectively extends and forms a soldering part, and each of the soldering parts is exposed outside the insulation shell.

6. The subscriber identity module connector according to claim 1, wherein each of the hollow areas is formed in a geometrical shape.

7. The subscriber identity module connector according to claim 1, wherein each of the regular parts and the detecting-regular part are respectively formed in a geometrical shape.

8. The subscriber identity module connector according to claim 1, wherein each of the contact parts and the detecting-contact part are respectively formed in a geometrical shape.

9. The subscriber identity module connector according to claim 1, wherein each of the first terminals, each of the second terminals and the detecting terminal are made of metal.

10. The subscriber identity module connector according to claim 1, wherein the hollow area placed with the detecting terminal is larger than the hollow areas only placed with the contact parts of the first terminals or the second terminals.

11. A subscriber identity module connector comprises a plurality of first terminals, a plurality of second terminals placed correspondingly to each of the first terminals, and an insulation shell accommodating the first terminals and the second terminals, wherein each of the first terminals and each of the second terminals is respectively formed with a regular part to form a space and a contact part extending from the regular part into the space, an interval is provided between each of the contact parts and each of the regular parts, and a plurality of hollow areas are formed on the insulation shell to allow each of the contact parts to expose outward, and the subscriber identity module connector is characterized in that:
a detecting terminal is placed in one of the hollow areas of the insulation shell, the detecting terminal is formed with a detecting-regular part forming an activity space, a detecting-contact part is extending from the detecting-regular part to the activity space, and the detecting-regular part is accommodated in the insulation shell, wherein the detecting-contact part extending from the detecting-regular part and one of the contact parts that plays a role as a ground terminal are placed in the same hollow area and are exposed outward from the same hollow area of the insulation shell,
wherein when one contact area of the subscriber identity module card simultaneously contacts with the detecting-contact part of the detecting terminal and the ground terminal, an electrical connection is established between the detecting terminal and the ground terminal.

12. The subscriber identity module connector according to claim 11, wherein each of the contact parts and the detecting-contact part respectively extends to form a curving part to allow each of the contact parts exposing outward from the hollow areas of the insulation shell and the detecting-contact part to protrude out of the insulation shell surface.

13. The subscriber identity module connector according to claim 12, wherein the free end of each of the curving parts is a reaching part.

14. The subscriber identity module connector according to claim 11, wherein each of the first terminals, each of the second terminals and the detecting terminal are covered by the insulation shell by an insert injection molding process, and each of the contact parts of the first terminals, each of the contact parts of the second terminals and the detecting-contact part of the detecting terminal are exposed from the hollow area.

15. The subscriber identity module connector according to claim 11, wherein each of the first terminals, each of the second terminals and the detecting terminal respectively extends and forms a soldering part, and each of the soldering parts is exposed outside the insulation shell.

16. The subscriber identity module connector according to claim 11, wherein each of the hollow areas is formed in a geometrical shape.

17. The subscriber identity module connector according to claim 11, wherein each of the regular parts and the detecting-regular part are respectively formed in a geometrical shape.

18. The subscriber identity module connector according to claim 11, wherein each of the contact parts and the detecting-contact part are respectively formed in a geometrical shape.

19. The subscriber identity module connector according to claim 11, wherein each of the first terminals, each of the second terminals and the detecting terminal are made of metal.

20. The subscriber identity module connector according to claim 11, wherein the hollow area placed with the detecting terminal is larger than the hollow areas only placed with the contact parts of the first terminals or the second terminals.

\* \* \* \* \*